May 15, 1962
V. E. MATULAITIS
3,035,149
DISCHARGE MACHINING APPARATUS AND METHOD
Filed July 27, 1959
4 Sheets-Sheet 1
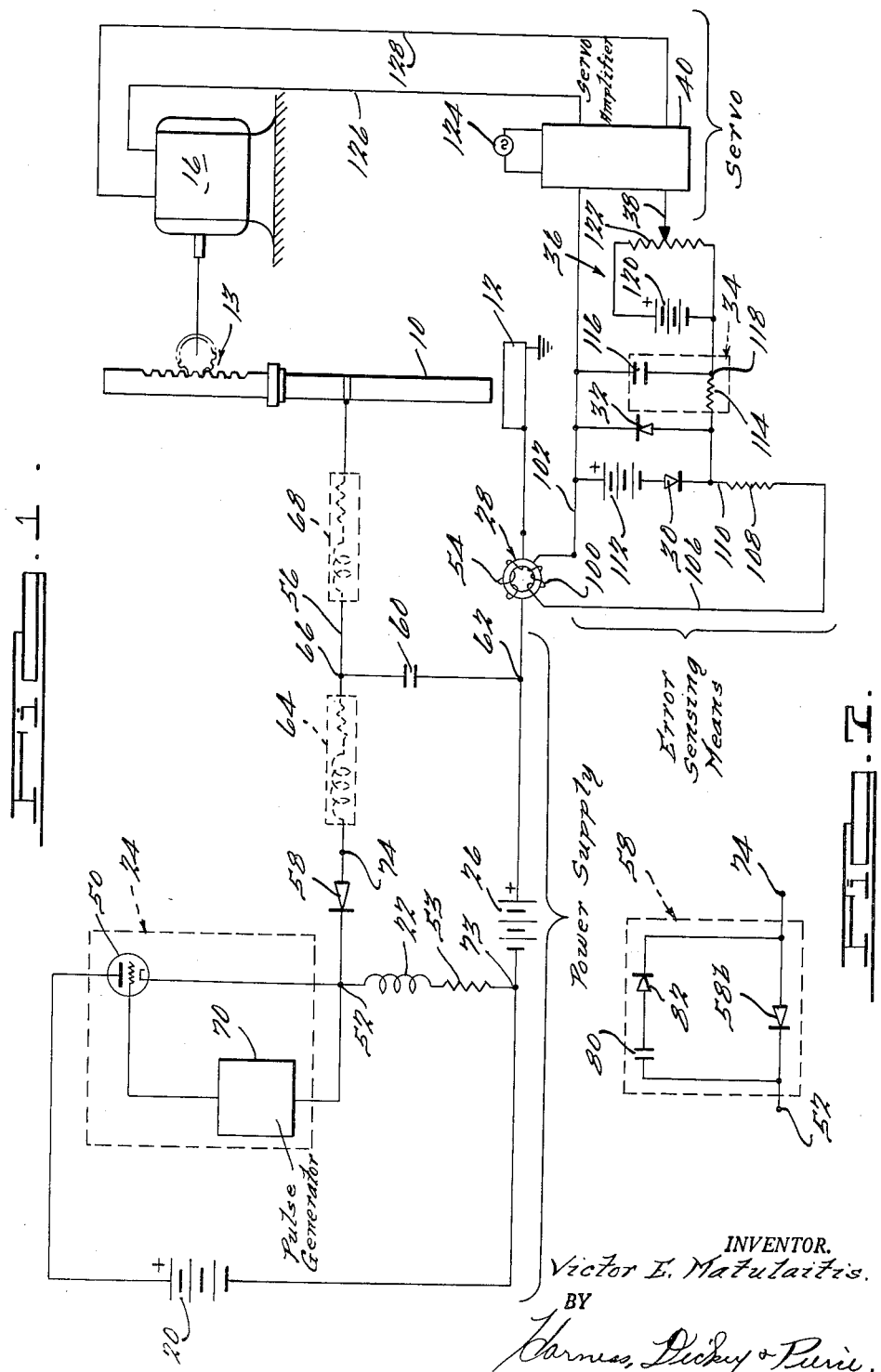
INVENTOR.
Victor E. Matulaitis.
BY
Harness, Dickey & Pierce.
ATTORNEYS.

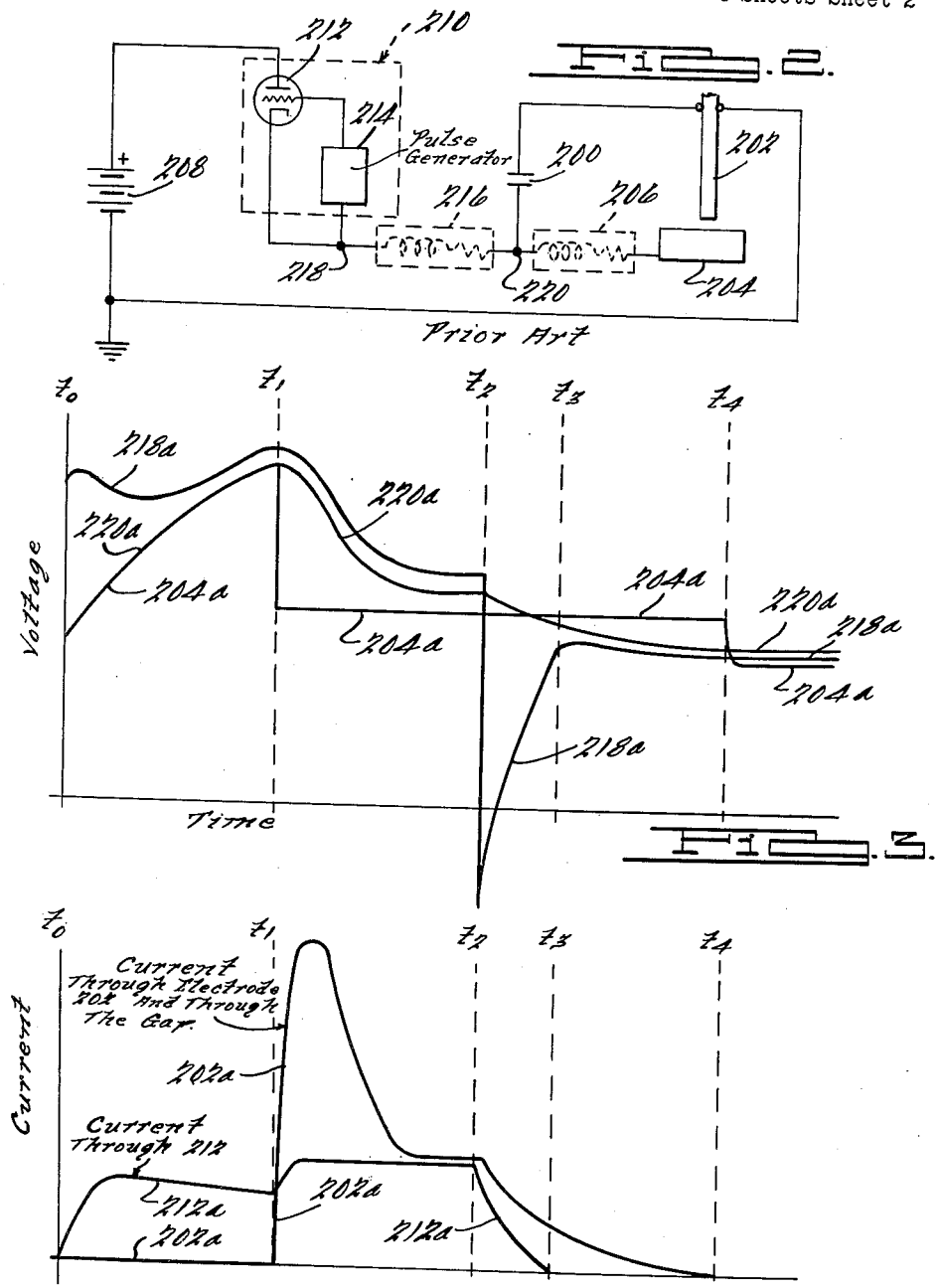

INVENTOR.
Victor E. Matulaitis.
BY
Harness, Dickey & Pierce.
ATTORNEYS.

May 15, 1962  V. E. MATULAITIS  3,035,149
DISCHARGE MACHINING APPARATUS AND METHOD
Filed July 27, 1959  4 Sheets-Sheet 4

INVENTOR.
Victor E. Matulaitis
BY
Harness, Dickey & Pierce
ATTORNEYS.

United States Patent Office 3,035,149
Patented May 15, 1962

3,035,149
DISCHARGE MACHINING APPARATUS
AND METHOD
Victor E. Matulaitis, Franklin, Mich., assignor to Matson
Company, Inc., Royal Oak, Mich., a corporation of
Michigan
Filed July 27, 1959, Ser. No. 829,880
44 Claims. (Cl. 219—69)

This invention relates to apparatus for and methods of electrical arc discharge machining.

An electrical arc discharge machining apparatus normally comprising an electrode movable with respect to a workpiece to establish a selectable gap therebetween, means for circulating a dielectric coolant through the gap, and a power supply for applying electrical energy to the gap. An electrical arc or spark discharge is repetitively established across the gap either, in normal practice, by applying pulsating energy to the gap with relatively static electrode-workpiece relationships or by physically vibrating the electrode relative to the workpiece to change the gap distance between one at which an arc is struck and one at which the arc is extinguished. Such units, and particularly those in which the repetitive discharge is established through the use of pulsating electrical energy rather than through vibration of the electrode, normally also include a servo mechanism or power feed for adjusting the position of the electrode relative to the workpiece to maintain a selected gap relationship as the workpiece is eroded.

In certain of the prior art practices, the power supply for applying pulsating electrical discharge energy to the gap takes the form of a capacitor connected across the gap, a source of direct volage having a magnitude which is greater than the average voltage across the gap and greater than the peak instantaneous gap voltage, and a switch for intermittently connecting the source to the capacitor. The switch is intended to serve as an alternately low-impedance and high-impedance connection between the source and the capacitor. This change in physical circuit impedance together with the discharge characteristics of the energy-storing capacitor tends to render the circuits sensitive to circuit inductances, particularly to the inductance in the discharge circuit for the capacitor including the conductors connecting the capacitor to the electrode and workpiece. The net effect of the inductive reactance is to limit the attainable frequencies of the gap discharges for any selected average gap current.

The power feed systems customarily employed in conjunction with apparatus of this nature normally comprise an error sensing circuit for indicating when and to what extent the gap conditions depart from a selected optimum, a servo motor for mechanically moving the electrode relative to the workpiece,. and a servo amplifier controlled by the error sensing circuit for controlling the servo motor. For the most part, the error sensing circuits have been arranged to respond to the average voltage across the gap on the basis of an understanding that the average gap voltage varies with the physical gap length at any given average current through the arc gap.

An object of this invention is to improve electrical arc discharge machining apparatus.

Another object of this invention is to improve power supply circuits for use with electrical arc discharge machining equipment.

A further object of this invention is to improve power feed equipment for use with electrical arc discharge machining equipment and more particularly to improve the error sensing apparatus constituting a part of the power feed equipment.

Another object of this invention is to reduce the limiting effect of distributed circuit inductances and resistances upon the arc discharge frequency.

Another object of this invention is to reduce the time required to extinguish the electrical discharge between the electrode and the workpiece so as to increase the efficiency of the apparatus.

A further object of this invention is to minimize the detrimental effects of the occasionally encountered undesirable mode of operation known as D.C. arcing.

Another object of the invention is to reduce the frequency of occurrence of D.C. arcing conditions.

A feature of this invention is a means for moving the movable electrode in an electrical arc discharge machining apparatus rapidly towards the workpiece in response to the occurrence of a D.C. arcing condition.

Another feature of this invention is a means for moving the movable electrode in an electrical arc discharge machining apparatus rapidly away from the workpiece in response to an indication of a short circuit between the workpiece and the electrode.

Another feature of this invention is an electrical arc discharge machining power supply having an inductive means as the primary discharge energy storing means.

Another feature of this invention is a power supply which supplies periodic energy to an arc gap by periodically diverting a substantially constant current flowing through an inductance from an auxiliary path to the arc gap.

Another feature of this invention is a power supply in which the switching means which controls the supply of energy to the primary energy storing device is not connected in series with the gap, and in which current flowing through the switching means does not flow through the arc and the current flowing through the arc does not flow through the switching means.

Another feature of this invention is a power supply in which the flow of current through the switching means which controls the transfer of energy to the primary energy storing device does not concur in point of time with the flow of energy from the primary energy storing device through the arc.

Another feature of this invention is to reduce the power handling requirements of the switching means which controls the transfer of energy from a power source to a primary energy storing device for any given level of average energy at the gap.

Another feature of this invention is a power supply comprising a control circuit for controlling the periodic application of energy to an arc gap discharge circuit and inductively coupled thereto by inductive means having a coupling coefficient of unity.

Another feature of this invention is a power feed for controlling the position of an electrode relative to a workpiece in accordance with the frequency of a periodic electrical discharge occurring between the electrode and the workpiece.

The manner of accomplishing the foregoing objects, the nature of the foregoing features, and other objects and features of the invention, will be understood from a consideration of the following detailed description of an embodiment of the invention, when read with reference to the accompanying drawings, in which:

FIGURE 1 is a schematic representation of an electrical arc discharge machining apparatus embodying the principles of the present invention and operable to constitute a practice of the improved methods for electrical arc discharge machining.

FIG. 2 is a diagrammatic representation of a prior art power supply for an electrical arc discharge machining apparatus;

FIG. 3 is a graphical representation of certain voltageversus-time relationships in the prior art circuit of FIG. 2;

FIG. 4 is a graphical representation of certain current-versus-time relationships in the prior art circuit of FIG. 2;

FIG. 7 is a diagrammatic showing of an equivalent circuit representing the effective nature of a unidirectional current conducting device utilized in the circuit of FIG. 1;

Figure 5:
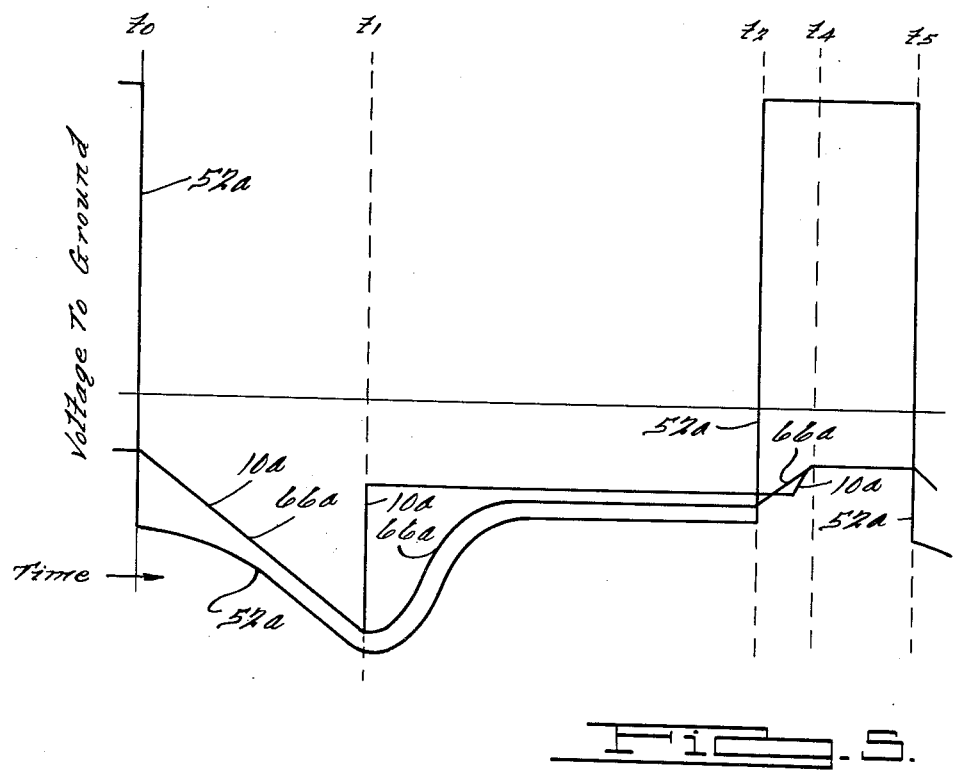
FIG. 5 is a graphical representation of certain voltage-versus-time relationships in the apparatus of FIG. 1.

In general, the electrical arc discharge machining apparatus shown in FIG. 1 comprises a movable electrode 10 supported in proximity to the workpiece 12 and movable with respect thereto by means, for example, of a rack and pinion arrangement 13, the pinion of which is driven by a servo motor 16.

Power supply means are provided for establishing between the electrode 10 and the workpiece 12 repetitive voltage relationships tending to produce an electrical discharge between the electrode 10 and the workpiece 12 through and in a liquid coolant which is flowed over the workpiece 12 and through the gap between the electrode 10 and the workpiece 12. During normal machining operations, the successive individual electrical discharges tend to occur between the instantaneously closest points of the workpiece and electrode areas, tending to produce the removal of minute particles from the workpiece to disintegrate or erode the workpiece. As a result, the location of the instantaneously closest spac- of the electrode and workpiece will tend to change after each discharge so that the successive discharges tend to occur at separated points in the arc gap. Since the arc thereby wanders over the gap area point by point in a random manner, an appreciable time normally elapses between successive discharges at any given point on the workpiece thereby permitting the workpiece to cool at this point and permitting the coolant to flush away the particles or chips which were produced by the preceding discharge. The elements of the power supply equipment illustrated in FIG. 1 of the drawings serve to apply the repetitively occurring electrical energy pulses to the arc gap to produce this disintegrating or eroding effect.

As erosion occurs, the spacing between the electrode 10 and the workpiece 12 tends to change, creating less than optimum conditions at the gap. Accordingly it is advisable to readjust the position of electrode 10 relative to the workpiece 12 to compensate for the change in gap conditions and to continuously adjust the relationship between the electrode 10 and the workpiece 12 to an optimum value. The elements of the error sensing circuit of FIG. 1 detect the existence, the direction, and the magnitude of the departure from optimum gap conditions, and the servo system including the servo motor 16 responds to the error sensing circuit to correct and adjust the position of the electrode 10 and the workpiece 12.

In general, the power supply equipment includes a primary source of energy 20, a primary energy storing means 22 in the form of an inductor, switching means 24 for controlling the transfer of energy to and from the primary energy storing means 22, a secondary source of energy 26, and the spark gap connected to receive energy from the primary energy storing means 22. The switching means 24 changes impedance at a relatively high frequency between a relatively high and a relatively low value so as to, in effect, close and open the circuit interconnecting the primary source of energy 20 and the primary energy storing means 22 at that frequency. When switching means 24 establishes a connection between source 20 and storing means 22, current from source 20 flows in a circuit including the switching means 24 and the primary energy storage means 22. When the switching means 24 opens that circuit, the inductor 22, acting as the primary energy storing means, acts (in accordance with Lenz's law) to tend to maintain a continuing current flow through itself in the same direction. Since switching means 24 has opened the circuit to primary source 20, this current cannot be derived from source 20 and hence must be drawn from the secondary source 26, and the current tends to flow through the gap between the electrode 10 and the workpiece 12, through the inductor 22, and back to the source 26 and that current does flow when the thereby-created voltage across the gap equals the deionization voltage of the gap so as to initiate a spark discharge. When switching means 24 again closes, it establishes, in effect, a low impedance path in shunt of the gap so as to, in effect, divert the current through the inductor 22 from the gap to the control circuit which includes the primary source of energy 20. The discharge is thereby terminated substantially instantaneously.

As will be discussed more fully hereinafter, conditions are established so that the gap occasionally fails to fire and so that the number of discharges between the electrode 10 and the workpiece 12 over a period of time will tend to be less than the number of actuations of the switching means 24 during that time. It is desirable for maximum speed, efficiency and quality of machining that the spark discharge frequency be quite high as, for example, in the order of 20 kilocycles per second, that the discharge be fully extinguished each such cycle, and that the extinction occur in the minimum possible time. Departure from optimum machining conditions is reflected in a change in the frequency of the discharge for any fixed frequency of operation of the switching means 24. Accordingly, the departures from the maximum machining conditions—the error signal—can be detected and, it is believed, are best detected, by sensing the frequency of the discharge. The error sensing circuit illustrated in FIG. 1 of the drawings serves to produce an error signal which varies in one or more characteristics in accordance with variations of the frequency of the spark discharges. In the preferred arrangement, that circuit produces an output direct voltage signal which varies in polarity in accordance with the direction of the departure of the machining condition from optimum, which varies in magnitude in accordance with the magnitude of the departure of the frequency of discharge from a preselected frequency, and which does not vary to any significant extent with variations in the instantaneous arc voltage or arc current.

To produce this signal, the error sensing circuit comprises a transformer 28 having a primary winding connected in series with the gap and a secondary winding, discriminator or counting means including clippers 30 and 32 connected to the secondary winding of the transformer 28 and an integrating network 34 for producing a direct voltage having an amplitude determined by the average energy output from the circuit including the clippers 30 and 32. This direct voltage is effectively compared with a reference direct voltage by means 36 to produce an error signal at conductor 38 having the above noted characteristics. This error signal is applied to the servo including servo amplifier 40 and servo motor 16 to control the position of the electrode 10 relative to the workpiece 12.

Since the discharge frequency cannot exceed the frequency of operation of the switching means 24, the establishing of conditions to provide, under optimum conditions, a discharge frequency slightly below the frequency of switching means 24 enables bidirectional error sensiitvity and, in the illustrated arrangement, a rise in frequency is corrected by increasing the gap or spacing between the electrode 10 and the workpiece 12 while a full or decrease in frequency from the optimum value is corrected by decreasing the gap.

As will be seen, means are also provided for obtaining a unique and unequivocal indication of the existence of the improper mode of operation known as D.C. arcing and for rapidly correcting such a condition.

It is to be understood that the term electrical arc discharge machining is intended to be generic to electrochemical machining. Additionally, while the servo system or power feed is illustrated as controlling the position of a relatively static electrode relative to a workpiece, the principles can be applied to the controlling of the average position of a vibratory type electrode.

Considering in detail the power supply circuit, the nature and significance of the improvements existing in the circuitry embodying the principles of the present invention may best be perceived by preliminarily considering the nature and operation of a representatative prior art power feed system such as that illustrated in FIG. 2 of the drawings. In that circuit, a primary energy storing means in the form of a capacitor 200 is connected in parallel with, that is, across, the gap between the electrode 202 and the workpiece 204 by means of a pair of conductors. These conductors, at the operating frequencies and currents which are employed, have substantial distributed resistance and inductance which for purposes of illustration are illustrated as lumped components 206. Energy is supplied to the capacitor 200 from a primary source of energy 208 under the control of a switching means 210 comprising a tube or blank of tubes 212 and a pulse generator 214. The conductors interconnecting the switching means 210 and the capacitor 200 also have disributed inductance and resistance, which are significant at the operating frequencies and currents, as is represented by the lumped components 216. The resistance and inductance of the lead between the switching means 210 and the capacitor 200 tend to cause a voltage difference to exist between point 218, at the switching means 210, and point 220, at the capacitor 200.

For clarity of understanding, the prior art circuit of FIG. 2 has been illustrated as having the electrode 202 connected to ground potential. The voltage-versus-time relationships between point 218 and ground, point 220 and ground, and workpiece 204 and ground are illustrated in curves 218a, 220a, and 204a, respectively, in FIG. 3 of the drawings, and the relationship between the current through tube 212 and time, and the relationship between the current through electrode 202 and hence through the arc gap and time are illustrated in curves 212a and 202a, respectively, in FIG. 4 of the drawings.

With reference to those curves, assume the cycle to begin at time $t_0$ at which instant tube 212 has just been rendered fully conductive. The voltage between point 218 and ground tends to rise toward a maximum value and is prevented from attaining the magnitude of source 208 only by the resistance or internal impedance of the tube bank 212. The voltage between point 220 and ground lags the voltage between point 218 and ground because of the inductance of the connecting cable, represented as an element of the lumped components 216.

Condenser 200 is charged during the interval $t_0$—$t_1$. During this interval, the voltage between the workpiece 204 and ground is substantially identical to the voltage between point 220 and ground because no current is flowing through the lumped components 206 due to the absence of a discharge between the electrode 202 and the workpiece 204. At time $t_1$, the gap discharge initiates. The voltage between workpiece 204 and ground, that is the gap voltage, drops abruptly to the arc voltage level which may, for example, be in the order of 14 to 15 volts.

Capacitor 200 begins to discharge its accumulated charge through the gap at a rate limited primarily by the inductance and resistance of the discharge circuit, represented as lumped components 206. The gap current is initially high because the gap passes both the conductance current through tube 212 and the discharge current of capacitor 200.

At some time approaching time $t_2$, substantially steady-state conditions prevail at the gap, with the gap current being supplied exclusively through tube 212 and with no current flowing into or out of capacitor 200. The voltage disparity between points 218, 220 and 204 is not great under these conditions, the curves of FIG. 3 being deliberately exaggerated for clarity of presentation.

At time $t_2$, pulse generator 214 attempts to render tube 212 nonconductive. However, since arc current is and has been flowing from point 218 to point 220 through the lead inductance and resistance represented by lumped components 216, this attempt to open the circuit will cause an inductive voltage to be generated across lumped components 216 having a polarity such that point 218 is negative relative to point 220. Accordingly, during the transient period from time $t_2$ to time $t_3$, tube 212 will not be rendered completely nonconductive because the inductive element of the lumped components 216 will generate whatever voltage may be required to momentarily pass the same magnitude of current which is flowing at the time that cut-off of the tube 212 is attempted. If a greater cut-off biasing signal is provided by readjusting the pulse generator 214, the peak inductive voltage across lumped components 216 at time $t_2$ will merely become greater and will in fact attain whatever magnitude is necessary to prevent a change of current. In order to produce the greater inductive voltage under this condition, the attendant magnetic field must collapse more rapidly, in accordance with the basic relationship that the voltage across the inductor is equal to the product of the number of turns times the time rate of change of flux times a constant. As a result, the effect of increasing the cut-off bias applied to tube 212 by pulse generator 214 is to decrease the duration of the time interval $t_2$ to $t_3$.

The action of the inductive element of the lumped components 216 during this period tends to produce an elevation of voltage at point 220 relative to ground and to charge the capacitor 200. As the current through tube 212 reduces in response to the application of a potential to its grid tending to drive it below grid cut-off, capacitor 200 discharges through the gap tending to maintain the arc. The voltage between point 220 and ground therefore falls, during the interval $t_2$—$t_4$, in the manner illustrated in curve 220a of FIG. 3 of the drawings. At such time as the inductive energy associated with the inductive element of the lumped components 206 is substantially fully dissipated, the voltage between point 220 and ground becomes less than that required to sustain an arc and the gap discharge ceases at time $t_4$ to complete the cycle.

Because the voltage levels involved are of such low magnitude, time interval $t_2$—$t_4$ is both relatively long and relatively indeterminate of duration and it is this factor which is primarily responsible for limiting the attainable gap discharge frequency. Hence, the delays in extinguishing discharge tend to result from the time required for the magnetic fields associated with the circuit wiring to decay.

The changes of the current through the tube 212 with time and the changes of the current through the electrode 202 and hence through the arc gap with time are illustrated in FIG. 4 to the same time scale as FIG. 3.

The power supply equipment illustrated in the lefthand portion of FIG. 1 of the drawings may conveniently be considered to comprise a control circuit and an operating or discharge circuit. The primary source of energy 20 is illustrated as constituting a battery, but of course may in practice be a conventional rectifying and filtering circuit for converting a source of line voltage into direct voltage. The positive terminal of source 20 is connected to the anode of tube 50 which, in practice, will normally take the form of a substantial number of vacuum tubes connected in parallel. The cathode of vacuum tube 50 is connected to a point 52 and to one terminal of the inductor 22 which serves as the primary energy storing device. The lower terminal of inductor 22 is connected to the upper terminal of a resistor 53 which is not imperative to the operation of the device but which helps to stabilize the operating conditions and serves as a degenerative feedback device to facilitate extinction of the discharge. The lower terminal of resistor 92 is returned to the negative terminal of source 20 and is also connected to the negative terminal of the secondary source 26. The positive terminal of source 26 is connected through the primary winding 54 of transformer 28 to the workpiece 12 which is grounded. The electrode 10 is connected via a lead 56 and a rectifier 58 to the upper terminal of inductor 22, that is, to point 52. A capacitor 60 is connected, at point 66, to lead 56 and, at point 62, to the conductor interjoining secondary source 26 and the primary winding 54. The interconnecting leads in the system have substantial distributed inductance and resistance as is represented by the lumped components 64 in the lead between the rectifier 58 and the point 66 and the lumped components 68 connected in the lead between point 66 and electrode 10.

The unidirectional current conducting device 58 is poled to pass conventional current from right to left, that is, it (and each of the other such devices illustrated in the drawings) presents a low impedance to conventional current flow in the direction of the arrow.

The tube 50 is controlled by a pulse generator 70 which cyclically applies a signal between the control grid and cathode of that tube tending to drive the tube alternately between full conduction and full cut-off.

The relationship between the gap voltage (the voltage between electrode 10 and workpiece 12) and time is illustrated in FIG. 5 of the drawings by the curve identified 10a, the relationship between the voltage from point 66 to ground and time is illustrated in the curve marked 66a in FIG. 5 of the drawings, and the relationship between the voltage between point 52 and ground and time is represented in the curve marked 52a in FIG. 5. Similarly, the relationship between the magnitude of the arc current and time is represented in curve 10b in FIG. 6 of the drawings and the relationship between the magnitude of the current through the tube 50 and time is illustrated in the curve marked 50b in FIG. 6 of the drawings.

Just before time $t_0$, tube or tube bank 50 is fully conductive, and steady-state current flows from source 20, through tube 50, through inductor 22 and resistor 53 back to the negative terminal of source 20. No current flows at this time through the arc gap between electrode 10 and workpiece 12.

At time $t_0$, pulse generator 70 abruptly renders tube bank 50 nonconductive. For the reasons previously discussed, inductor 22 will generate across its terminals whatever voltage is required, both in magnitude and polarity, to produce a momentary continuation of the current flow which prevailed at the time tube bank 50 was rendered nonconductive. Accordingly, the voltage between point 52 and ground, represented in curve 52a, instantaneously becomes sufficiently negative to cause the required current to flow over a path from the lower terminal of inductor 22, resistor 53, secondary source 26, point 62, capacitor 60, point 66, lumped components 64, point 74, rectifier 58, point 52, and back to inductor 22. Due to the relatively low impedance of that circuit, the voltage at point 52 does not fall sufficiently to force conduction in tube 50.

The flow of current in the traced circuit charges capacitor 60 to a sufficient magnitude at time $t_1$ to cause gap discharge. The voltage directly across the gap, represented by curve 10a in FIG. 5, drops to the arc voltage level instantaneously, and the voltage between point 66 and ground (curve 66a) drops more slowly because of the wiring inductance as represented by the inductive element of the lumped components 68.

During the transition period following time $t_1$, gap current is normally high because this current is a combination of the substantially constant current flowing through the inductor 22 and the discharge current of capacitor 60. At some time approaching time $t_2$, capacitor 60 ceases to contribute to gap current and the gap current becomes equal to the current through inductor 22.

It is preferred for optimum operation that inductor 22 have sufficient inductance so that no substantial change of the magnitude of the current through that inductor will occur during the time interval $t_0$—$t_2$.

Figure 6:
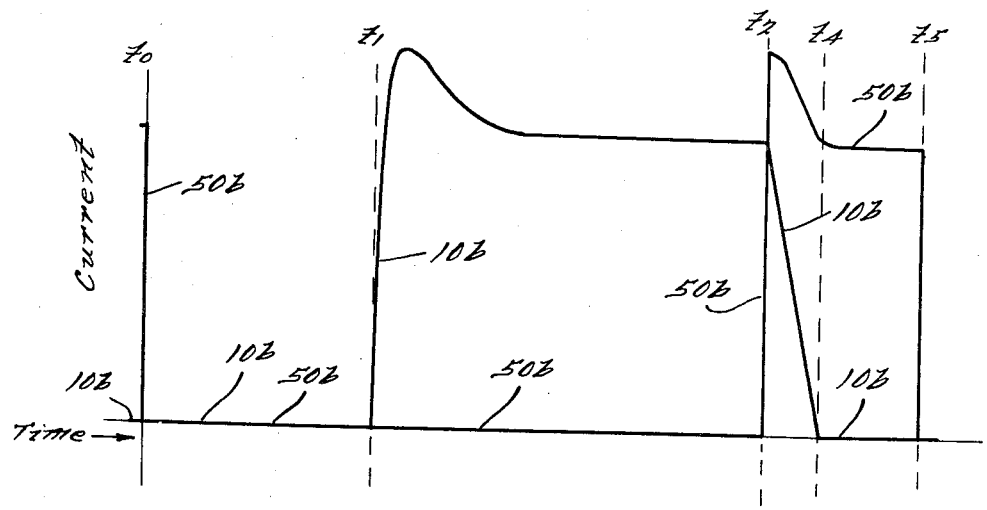
FIG. 6 is a graphical representation of certain current-versus-time relationships in the apparatus of FIG. 1.

It should be observed that the charging of capacitor 60 and the subsequent gap discharge take place while no current is flowing through the tube bank 50 as is illustrated in curve 50b in FIG. 6 of the drawings.

At time $t_2$, pulse generator 70 renders tube bank 50 abruptly conductive. Inductor 22 therefore tends to function as a generator to oppose the increase of current through it and as a result the voltage between point 52 and ground rises very abruptly as is illustrated in curve 52a in FIG. 5. At this time, several transient effects occur which are not completely understood but which in combination result, in practical effect, in the substantially complete elimination of the counterpart of the time interval shown as $t_2$—$t_3$ in FIGS. 3 and 4 and in reducing the counterpart of the time interval $t_2$—$t_4$ of FIGS. 3 and 4 to a fraction of that observed in prior circuits.

It is believed that these advantages arise at least in part from the use of a semi-conductor or solid-state diode 58 in the spark discharge circuit. Although the behavior of such a diode in the transition from its conducting to its voltage blocking states is probably not precisely defined by the equivalent circuit shown in FIG. 7 of the drawings, that circuit is believed to represent a reasonably accurate approximation. In that circuit, the diode 58 is represented as being the equivalent of a diode 58b poled similarly to diode 58, and shunted by a series circuit including a small capacitor 80 and a diode 82 connected in opposite polarity to diode 58b. In the equivalent circuit of FIG. 7 it is assumed that diodes 58b and 82 are perfect.

During normal conduction, current flows from point 74 in FIG. 7 to point 52 through diode 58b. During the blocking voltage condition, current is prevented from flowing from point 52 to point 74 by the blocking action of rectifier 58b and current flow, under these steady conditions, through the upper branch of the circuit is blocked by capacitor 80. However, during the transition from the conducting state to the blocking state of the entire diode 58, a momentary reverse current can flow from point 52 to point 74 which is the charging current for capacitor 80.

In the actual circuit of FIG. 1 it might be expected on the basis of considerations of the circuit inductances, that the voltage at point 74 would rise substantially above that at point 66 at the time $t_2$ at which tube 50 is rendered conductive. If such a rise does occur, its time duration must be exceedingly small for it is not discernible by oscillographic study. Instead, the transient reverse current through diode 58 seems completely to predominate.

Additionally, this transient reverse diode current has been found to be sufficient in magnitude, with an appropriate diode 58, to abruptly alter the charge on capacitor 60 to radically decrease the inductive time delay of the wiring impedance represented by lumped components 68. This is illustrated in curve 66a of FIG. 5. Thus, as contrasted with the prolonged decay of arc gap current illustrated in FIGS. 3 and 4, the reverse diode current through diode 58 tends to abruptly raise the voltage at point 66, at the upper terminal of capacitor 60, sufficiently to cause a distinct and abrupt cessation of arc gap current. The reduction in the time required to extinguish the arc enables the time interval between successive gap discharges to be materially decreased so as to establish a corresponding increase in the percentage of time in which effective machining is occurring, thereby increasing the efficiency of the system.

By virtue of the illustrated construction, the current carrying capacity requirements of the tube bank 50 are appreciably and materially reduced. For example, if during normal operation a substantially constant current of 25 amperes flows through inductor 22 and if the time interval $t_2$—$t_5$ illustrated in FIGS. 5 and 6 is one-fifth of the total cycle time $t_0$—$t_5$ tube bank 50 will be called upon to carry the 25 ampere current but one-fifth of the time, that current during the remaining four-fifths of the period being diverted to or forced to flow through the arc gap either directly or into capacitor 60 which subsequently discharges its current accumulation through the gap. Therefore, the average current carried by the tube bank 50 is, under these operating conditions, but 5 amperes even though the average current through the gap discharge circuit is 20 amperes. Thus, only a 5 ampere aggregate capacity of tube bank 50 is required to control a 20 ampere gap current, an advantage which accrues from the fact that tube bank 50 is not connected in series with the arc gap. None of the current through the tube bank directly flows through the gap and none of the gap current directly flows from the tube bank 50.

Capacitor 60 is but an ancillary charge storing device and its function so far as the power supply is concerned is but to reduce the magnitude of certain transients. Its primary function, however, is in connection with the detection of a short circuit condition between the workpiece and electrode as will be discussed hereinafter.

In a constructed embodiment of the invention, in order to provide 20 amperes average current through the arc gap, the parameters were arranged so that an average current of 5 amperes flowed through the tube bank 50 and as a result, 20 dual section 6AS7 tubes were connected in parallel, each of those sections being rated at one-eighth ampere. With the pulse generator 70 applying rectangular pulses at a 20 kilocycle per second frequency between the control grids and cathodes of the tubes 50 in the tube bank, the tube conduct current for 10 microseconds and are nonconductive for 40 microseconds. Therefore, while each section actually carries five-eighths of an ampere for short periods, at the noted frequency, the sections are not called upon to carry overload average currents.

In a constructed embodiment of the invention inductor 22 was formed of 60 turns of No. 6 wire wound on a laminated stack having a square cross-section 3 inches on a side, resistor 53 was selected to have a value in the range of 1 to 20 ohms, the drop across the gap during discharge was 14 to 15 volts, the average arc current was 20 amperes, and the current through inductor 22 averaged about 25 amperes and would rise during the period of conductivity of tube 50 to about 25.05 amperes and would fall during the period of non-conductivity of the tube 50 to about 24.95 amperes. Diode 94 was a silicon 100 ampere rectifier having a 300 volt rating, capacitor 200 was in the order of 10–12 microfarads (although its value would be selected in accordance with the length of the leads and other factors), voltage source 20 produced a voltage of 150 volts, and voltage source 26 produced a voltage of 22 volts. Voltage source 26, while represented as a battery, could well take the form of a conventional rectifier and filter for converting line voltage to direct voltage and of course common components could be used for the two voltage sources 20 and 26.

The error sensing circuit illustrated in FIG. 1 of the drawings is responsive to the frequency of the electrical discharges through the gap which, as above discussed, normally occur at a slightly lower frequency than the frequency of operation of the switching means 70. While the error sensing circuit means operates satisfactorily and advantageously in conjunction with a power supply circuit of the type illustrated, it will be appreciated that the error sensing circuit can be used in conjunction with electrical arc discharge machining apparatus having other types of power supplies for the reason that it is a common characteristic of electrical arc discharge machining apparatus that the discharge must be repetitively established and terminated, producing a corresponding variation in the current in the discharge circuit which can be detected by the subject error sensing means. Conversely, it is not imperative to the satisfactory application of the principles of the disclosed power supply circuit that an error sensing circuit of the illustrated nature be employed. However, in combination, the two concepts have proved to provide advantageous results and hence the illustrated arrangement is preferred.

To sense the changes of the current in the gap, the primary winding 54 of transformer 28 is connected in series between the source 26 and the workpiece 12, although it will be understood that the primary winding can be connected in the discharge circuit at other points. One terminal of the secondary winding 100 of transformer 28 is connected to conductor 102 while the other terminal of that secondary winding is connected via conductor 106 to resistor 108. The other terminal of that resistor is connected to conductor 110. A serially interconnected source of direct voltage 112 and the unidirectional current conducting device 30 are connected between conductor 102 and conductor 110 as is the unidirectional current conducting device 32. The elements including secondary winding 100, source of potential 112, resistor 108 and rectifiers 30 and 32 constitute, in essence, a counting circuit for producing an output pulse in response to each pulse of current through the primary winding 54 of transformer 28. These output pulses are integrated by means of a network including resistor 114 and capacitor 116 connected in series with one another between conductors 110 and 102. The junction of resistor 114 and capacitor 116, identified as point 118, is connected to the junction of the negative terminal of a source of direct voltage 120 and one terminal of the resistive element of a potentiometer or variable voltage divider 122. The positive terminal of source 120 and the other terminal of the resistive element of the potentiometer 122 are directly interconnected. The wiper of potentiometer 122 is connected via conductor 38 to the servo amplifier 40 with conductor 102 serving as the other input lead to that amplifier. Servo amplifier 40 is energized from a source of line voltage 124 and its output conductors 126 and 128 are connected to the servo motor 16 to control the operation of that motor.

In the above noted constructed embodiment of the invention, the primary winding 54 of transformer 28 was simply a straight portion of the conductor extending between point 62 and workpiece 12 and hence was but a one-turn winding. The secondary winding was formed of 50 turns of relatively fine wire. Voltage source 112, which has its positive terminal connected to conductor 102 and its negative terminal connected to the diode 30, had a value of 2 volts. Rectifiers 30 and 32 were small communication-type silicon or germanium diodes such as those identified 1 N90 or SG22. Many other types are satisfactory. Resistor 108 serves a decoupling function to prevent shorting of the secondary winding 100 of the transformer 28 and was representatively 1,000 ohms. Resistor 114 and capacitor 116 were selected to have a time constant appropriate to integrate the pulses over about 10 cycles. Since the output signal appearing between point 118 and conductor 102 in the constructed embodiment ranged from zero to about 1.5 volts, battery 56 was selected to provide a voltage of approximately that magnitude. The servo amplifier 40 and the servo motor 16 may be of any of a large number of types, and the unit used in the constructed embodiment of the invention utilized a two-phase motor.

It will be appreciated that all of the parameters and sizes herein presented are purely representative and are submitted solely to facilitate investigation by others. The circuit is not critical and various changes may be made both in the sizes of the elements and in the number and connections of the elements without departing from the principles of the invention. As one example, battery 112 is provided to establish a higher amplitude output signal and can, if desired, be increased in size, decreased, or omitted altogether.

It will also be appreciated that the fundamental principle of the error sensing means is to derive an output signal which varies in a selected characteristic or characteristics with changes in the frequency of the arc discharge and as a result may take any of a number of forms. An events per unit time meter could, for example, be utilized to develop the error signal.

Figure 8:
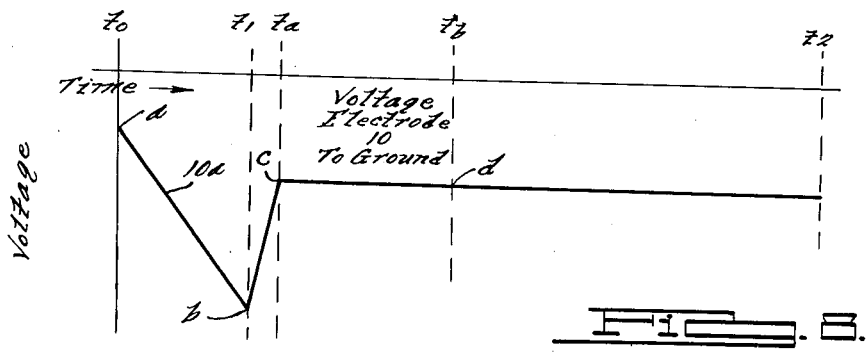
FIG. 8 is a graphical representation of certain other voltage-versus-time relationships in the circuits of FIG. 1.
Figure 9:
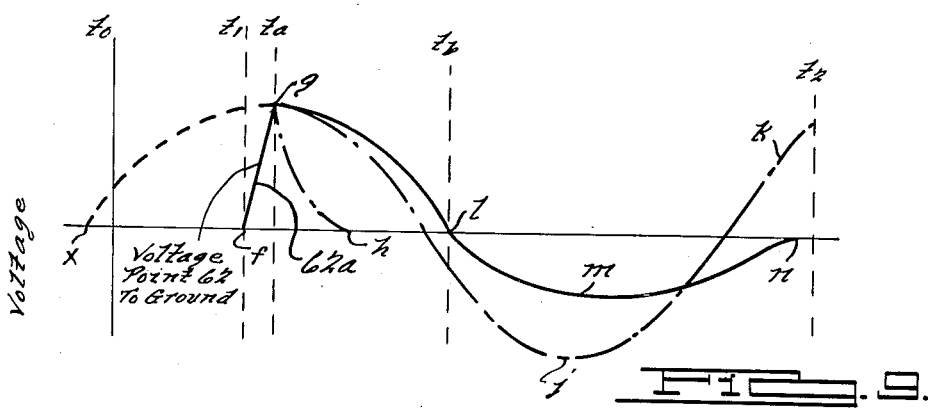
FIG. 9 is a graphical representation of certain other voltage-versus-time relationships in the circuit of FIG. 1.
Figure 10:
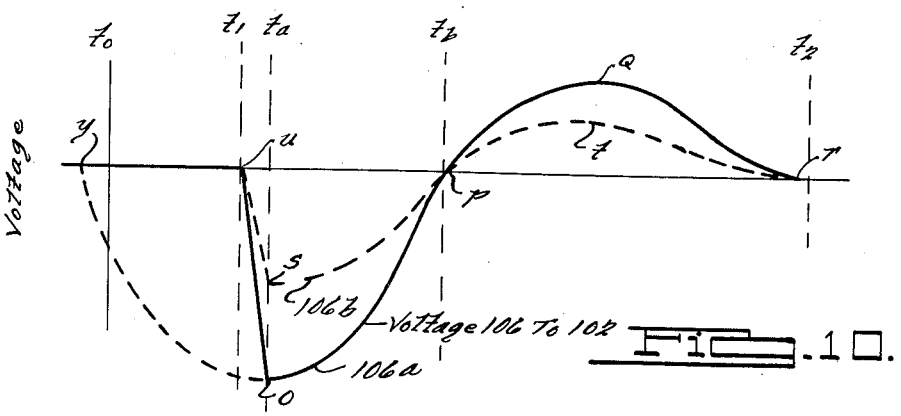
FIG. 10 is a graphical representation of certain other voltage-versus-time relationships in the circuits of FIG. 1.
Figure 11:
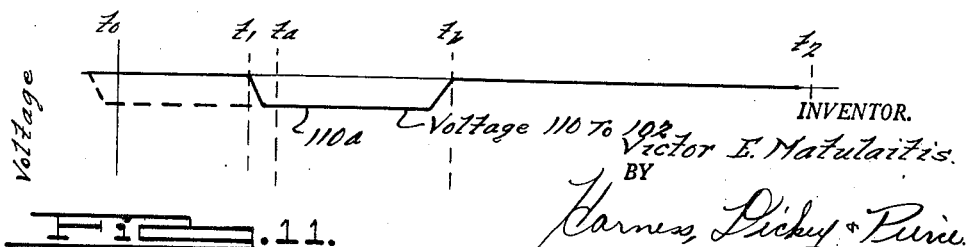
FIG. 11 is a graphical representation of certain other voltage-versus-time relationships in the circuit of FIG. 1.

The nature and operation of the error sensing means illustrated in FIG. 1 of the drawings can best be understood with reference to the graphical representation of the voltage-versus-time relationships at several points in that circuitry represented in FIGS. 8 through 12 of the drawings. In those figures, curve 10a of FIG. 8 represents the voltage across the arc gap, that is, the voltage between electrode 10 and the workpiece 12 which is grounded, curve 62a of FIG. 9 represents the voltage between point 62 and ground under certain different conditions, curves 106a and 106b of FIG. 10 represent the voltage between conductors 106 and 102 under certain different conditions, and curve 110a of FIG. 11 represents the voltage between conductors 110 and 102 under certain different conditions.

As in the graphs of FIGS. 5 and 6, it is assumed that at time $t_0$, means become effective to cause the voltage across the gap and across any capacitor connected in shunt thereof to become more negative as is illustrated from time $t_0$ to time $t_1$, points $a$ to $b$, on curve 10a (FIG. 8) of the drawings. At time $t_1$, point $b$, the voltage across the gap becomes sufficient, for a given gap length, to ionize the gap and current begins to flow through the gap.

While the voltage between electrode 10 and workpiece 12 (ground) abruptly drops (becomes less negative) to the arc voltage level at the instant of discharge, the time interval during which this drop is occurring, time interval $t_1$—$t_a$ in FIGS. 8 through 11 of the drawings, is represented as being significant solely for purposes of clarity. In the constructed embodiment of the invention, the time interval $t_1$—$t_a$ was actually less than one microsecond.

In view of the shortness of the interval of time $t_1$—$t_a$, there is no measurable change in the charge on capacitor 60 during this interval and accordingly the voltage between the lower terminal of that capacitor (point 62) and ground, which is as shown from points $f$ to $g$ of curve 62a in FIG. 9 of the drawings, rises in a positive sense during this interval.

The peak magnitude of the voltage between point 62 and ground, as represented at point $g$ on curve 62a of FIG. 9, is numerically equal to the difference between the voltage across the capacitor 60 at the time the arc is initiated and the arc voltage. The voltage between point 62 and ground is of course the voltage across the primary winding 54 of transformer 28 plus the voltage across any distributed inductance and resistance of the lead.

At time $t_a$, capacitor 60 commences to discharge due to the voltage unbalances. If the discharge circuit contained no inductance, capacitor 60 would discharge in the well-known exponential manner such as along path $g$—$h$ illustrated in dotted line in FIG. 9 of the drawings. If the discharge circuit contained appreciable inductance with negligible resistance, the voltage between point 62 and ground would tend to oscillate in a sinusoidal manner such as along the dash-dot curve marked $g$—$j$—$k$ in FIG. 9 of the drawings. In actual practice, although the inductance of the primary winding 54 of the transformer 28 is appreciable and predominates, in view of the circuit and arc resistances the actual discharge path approximates a severely damped sinusoid as is represented by the solid line curve $g$—$l$—$m$—$n$ in FIG. 9 of the drawings.

It is preferred that the secondary winding 100 of transformer 28 be closely coupled to the primary winding 54 and as a result the voltage between conductors 106 and 102 in FIG. 1 of the drawings tends to vary in direct proportion to the voltage between point 62 and ground as is represented by curves 106a and 106b of FIG. 10 of the drawings. The voltage between conductors 106 and 102 as represented in FIG. 10 of the drawings will therefore vary in accordance with the voltage across capacitor 60. For example, if the voltage across capacitor 60 is high at the instant $t_1$ at which discharge is initiated, the voltage between conductors 106 and 102 will vary in accordance with the solid line curve 106a of FIG. 10, rising to a high negative value during the transition time $t_1$—$t_a$ and then following a sinusoidal path $o$—$p$—$q$—$r$, crossing the axis at point $p$ and at time $t_b$. If the voltage across capacitor 60 is relatively low at the time $t_1$ at which discharge is initiated, the voltage between conductor 106 and conductor 102 will have a smaller amplitude as is represented, for example, by the dotted-line curve 106b in FIG. 10 which includes the sinusoidal portion $s$—$p$—$t$—$r$. However, since the time interval from $t_a$ to $t_b$ is principally determined by the value of the inductance of winding 54 and capacitor 60, that time interval will be substantially constant independently of the magnitude of the charge on the capacitor 60 at the time that discharge is initiated, as is illustrated by the curve sections $s$—$p$ and $o$—$p$ in FIG. 10, and since the time interval $t_1$—$t_a$ is negligibly small, the total time $t_1$—$t_b$ will also be substantially constant, as is illustrated by the curve sections $u$—$s$—$p$ and $u$—$o$—$p$ in FIG. 10.

The voltage between conductors 106 and 102, as represented in FIG. 10 of the drawings, is applied across the network including elements 112, 30, 32 and 108 illustrated in FIG. 1 of the drawings. With the representative value of source 112 of 2 volts, it will be perceived that the voltage between conductor 110 and conductor 102 will be prevented by diode 30 from becoming more negative than a negative 2 volts and that the voltage at conductor 110 is prevented by diode 32 from becoming positive relative to the voltage at conductor 102. In other words, the voltage between conductor 110 and conductor 102 is clamped by diodes 30 and 32 within relatively close limits.

As the voltage between conductors 106 and 102 becomes negative during the cycle, the voltage between conductors 110 and 102 will likewise tend to become negative because resistor 108 interconnects conductors 106 and 110.

As the voltage between conductors 106 and 102 becomes more negative during time $t_1$ to $t_a$, the voltage between conductors 110 and 102 is clamped so that it cannot become more negative than a negative 2 volts. When the voltage between conductors 106 and 102 becomes positive, the voltage between conductors 110 and 102 is clamped or prevented from going positive. The resultant voltage between conductors 110 and 102 is represented in curve 110a of FIG. 11 of the drawings. The negative pulse or signal represented in FIG. 11 of the drawings is produced each time that an arc discharge takes place. Because the voltage of battery 112 is quite low, as noted, compared with the peak values of the voltages between conductors 106 and 102 (which may run in the order of 50 to 300 volts), the voltage-time product of the curve of FIG. 11 (that is, its area) is substantially constant independently of the magnitude of the charge on capacitor 60 at the instant that discharge occurs.

The successive voltage pulses or signals, one of which is illustrated in FIG. 11, are integrated by the network comprising resistor 114 and capacitor 116 to produce an average or D.-C. voltage having a magnitude which varies in accordance with the frequency of the arc discharge but which is substantially independent of the voltage across capacitor 60 at the instant that discharge is initiated.

The signal appearing between point 118 and conductor 102 is applied to the source of reference voltage comprising battery 120 and potentiometer 122. The voltage appearing across the lower portion of the resistive element of potentiometer 122, that is, between point 118 and conductor 38, is in polarity-opposed relationship to the voltage produced between point 118 and conductor 102 by the error sensing means. Accordingly, the voltage between conductor 38 and conductor 102 varies in amplitude with the magnitude of the departure of the actual discharge frequency from a preselected discharge frequency and varies in polarity in accordance with the direction of deviation of the actual discharge frequency from the preselected frequency. It is this voltage which is applied to the proportional and reversible servo including amplifier 40 and motor 16.

On occasion, it is found during the performing of an arc machining operation that when sufficiently unusual or detrimental gap conditions exist, generally caused by the accumulation of excessive sludge or chips in localized areas or pockets of the arc gap, the arc machining apparatus malfunctions in a manner characterized as D.-C. arcing or burning. The phenomenon of D.-C. arcing is characterized by the tendency of the discharges to remain confined within a relatively small localized area of the total gap area, that is, of the total area of the workpiece which is adjacent the electrode. It has been further noted that during the time when D.-C. arcing occurs, operation of the system degenerates in the particular that the discrete or individual arcs or sparks become a substantially continuous direct current arc. Oscillographic studies of the arc gap under these conditions have shown a substantially constant gap voltage normally in the order of 4 to 15 volts in magnitude depending upon the electrode and the workpiece materials and the gap conditions. The average gap voltage is, in normal practice, usually adjusted to a value of about 18 volts or more.

Operation of the equipment under a D.-C. arcing condition for even a short period of time tends to injure or destroy the workpiece, a result apparently accruing from the inability of the workpiece to dissipate, at a small area, the heating effects of the substantial electric power represented by the product of gap current and gap voltage.

In certain of the prior art systems, the position of the electrode relative to the workpiece is controlled by a power feed system responsive to the average voltage across the gap. In some cases the voltage change, which occurs when D.-C. arcing exists, may be very minor so that a system utilizing average arc voltage error sensing equipment would not detect the condition nor initiate corrective measures. If the machine is adequately sensitive to detect the reduction of voltage which does or may occur in response to D.-C. arcing conditions, the servo mechanism will retract the electrode from the workpiece since a reduction in average arc voltage connotes, to such error sensing systems, that the electrode is too close to the workpiece. Since the change in average arc voltage which occurs under these conditions is usually not great, the retraction is at less than the maximum rate and the D.-C. arcing condition tends to continue for an appreciable length of time and until the electrode has been moved a distance away from the electrode which is relatively substantial in comparison with the normal electrode-to-workpiece spacing.

In the subject system in which the gap relationships are controlled by sensing the frequency of the arc discharges, the establishment of a D.C. arcing condition is reflected in an indication to the error sensing means that the frequency of the discharge has dropped to zero. Otherwise stated, a relatively steady current through the primary winding of the sensing transformer 28 will not result in the induction of a voltage across the secondary winding of that transformer. Since the subject power feed system serves to increase the spacing between the electrode and the workpiece in response to an increase of the discharge frequency relative to the preselected frequency and to decrease the spacing between the electrode and the workpiece in response to a decrease in the discharge frequency relative to the preselected frequency, the existence of a condition producing an indication that the discharge frequency has dropped to zero is not only an indication that the electrode should be advanced toward the workpiece but is the maximum such indication, so that the electrode advances towards the workpiece at the maximum rate. This advance continues until the electrode contacts the workpiece, establishing a short circuit condition.

In the illustrated arrangement, the values of capacitor 60 and of the discharge circuit inductance including the inductance of primary winding 54 are selected so that when the electrode 10 and workpiece 12 are directly connected together, the resonant frequency of the discharge circuit will be, advantageously, substantially equal to or some integral multiple of the frequency of the power supply and more particularly of the pulse generator 70. This resonant circuit is shock excited by the application of the power pulses to it and oscillates at its resonant frequency. In the preferred arrangement, the duration of the interval $t_a$—$t_b$ in FIGS. 8–11 substantially doubles in response to this condition. This follows because under the short circuit condition, the interruptions in the curves of FIGS. 8–11 such as b—c, f—g and u—o do not exist. The voltages become simple sinusoidal curves such as x—g—l in FIG. 9 and y—o—p in FIG. 10 with the result that the output voltage between conductor 110 and conductor 102, as represented by the dotted-line curve in FIG. 11 substantially doubles. While the amplitude of the output pulses as applied to the integrating network including capacitor 116 and resistor 124 does not significantly change under these conditions, the fact that each pulse is of substantially twice the duration that it is under normal conditions produces a substantial increase in the average D.C. output voltage between point 118 and conductor 102. This produces a signal indicative of a too close gap spacing and hence causes the electrode to be retracted from the workpiece. Further, in view of the magnitude of this signal, the electrode is retracted at its maximum rate.

In the constructed embodiment, for example, the discharges occurred, under certain normal circumstances, at a frequency of 19,500 cycles per second when the pulse generator was set at 20,000 cycles per second. With one set of settings of the equipment, the voltage across capacitor 116 was 0.97 volt, at the 19,500 cycle per second frequency, 1.00 volt when the discharge frequency rose to 20 kilocycles per second, and 0.95 volt when the discharge frequency fell to 19 kilocycles per second. Thus, the direct voltage magnitude versus discharge frequency relationship was rectilinear in normal operation. However, the 20 kilocycles per second sinusoidal oscillations produced by short circuitry of the electrode and workpiece produced a direct voltage of about 1.9 volts, producing a very strong indication that the electrode should be retracted.

If for any reason the D.C. arcing condition becomes re-established as the electrode retracts, the cycle will repeat.

The condition of D.C. arcing is most apt to occur at operation during short gap lengths. If the gap length be, for example, one-thousandth of an inch long when the D.C. arcing condition arises, the power feed has to advance the electrode only that distance to produce a short circuit and thereby to quench the arc so as to initiate cooling of the workpiece. Thus, the distance that the electrode must be advanced to quench the arc is very small relative to the distance which an electrode must be retracted to extinguish the arc. Further, the advance is at a maximum rate so that the total duration of the D.C. arc will be small so as to minimize the possibility of workpiece damage.

It will further be perceived that the advancing of the electrode towards and into engagement with the workpiece in response to a D.C. arcing condition will tend to cause the coolant and the accumulated sludge and chips between the electrode and the workpiece to be forced away from the machining area and that one or more cycles of the advancing and retracting action will produce a pumping action tending to propel the coolant out of the gap and to draw coolant rapidly back into the gap and thus cause the coolant to exert mechanical forces tending to flush out the chip accumulations.

It will further be perceived that the physical engagement between the electrode and the workpiece will tend to break up or loosen chip accumulations due to the mechanical force of the engagement, and it is further believed that the momentary physical contact between the electrode and the workpiece tends to produce cooling of the locally overheated workpiece area.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. In an electrical arc discharge machining apparatus having an electrode for performing a work operation upon a workpiece and means for repetitively establishing a transient arcing condition between the electrode and the workpiece, sensing means responsive to a characteristic of the arc discharge, control means responsive to said sensing means for controlling the position of the electrode relative to the workpiece in accordance with said characteristic, and means including said sensing means and said control means responsive to a D.C. arcing condition between the electrode and the workpiece for moving the electrode toward the workpiece.

2. In an electrical arc discharge machining apparatus having an electrode for performing a work operation upon a workpiece and means for repetitively establishing a transient arcing condition between the electrode and the workpiece, sensing means responsive to a characteristic of the arc discharge, control means responsive to said sensing means for controlling the position of the electrode relative to the workpiece in accordance with said characteristic, and means including said sensing means and said control means responsive to a D.C. arcing condition between the electrode and the workpiece for moving the electrode into engagement with the workpiece.

3. In an electrical arc discharge machining apparatus having an electrode for performing a work operation upon a work-piece and means for repetitively establishing a transient arcing condition between the electrode and the workpiece, sensing means responsive to a characteristic of the arc discharge, control means responsive to said sensing means for controlling the position of the electrode relative to the workpiece in accordance with said characteristic, and means including said sensing means and said control means responsive to a d.c. arcing condition between the electrode and the workpiece for moving the electrode into engagement with the workpiece, and means including said sensing means and said control means responsive to a short circuit between the electrode and the workpiece for moving the electrode away from the workpiece.

4. The method of controlling the position of an electrode relative to a workpiece in an electrical arc discharge machining equipment including means for repetitively establishing an electrical discharge between the electrode and the workpiece which comprises the steps of sensing the frequency of the repetitive electrical discharges, and moving the electrode in response to variations of the frequency of the repetitive electrical discharges.

5. The method of controlling the position of an electrode relative to a workpiece in an electrical arc discharge machining equipment including means for repetitively establishing an electrical discharge between the electrode and the workpiece which comprises the steps of deriving a voltage having a magnitude which varies in accordance with the frequency of said electrical discharges, and moving the electrode in response to variations of the magnitude of the derived voltage.

6. The method of controlling the position of an electrode relative to a workpiece in an electrical arc discharge machining equipment including means for repetitively establishing an electrical discharge between the electrode and the workpiece which comprises the step of deriving a pulsating voltage which varies in frequency in accordance with the frequency of said electrical discharges, deriving from the pulsating voltage a direct voltage having a magnitude which varies in accordance with the frequency of said pulsating voltage, and controlling the position of the electrode in accordance with the magnitude of the direct voltage.

7. The method of controlling the position of an electrode relative to a workpiece in an electrical arc discharge machining equipment including means for repetitively establishing an electrical discharge between the electrode and the workpiece which comprises the step of deriving a pulsating voltage which varies in frequency in accordance with the frequency of said electrical discharges, rectifying and clipping said pulsating voltage to produce a direct voltage having a magnitude which is effectively insensitive to variations of the average magnitude of the voltage between the electrode and the workpiece and which varies substantially exclusively in accordance with the frequency of said electrical discharges, and controlling the position of the electrode in accordance with the magnitude of the direct voltage.

8. In an electrical arc discharge machining apparatus including an electrode, a workpiece, and means for repetitively establishing an electrical discharge between the electrode and the workpiece, the combination of means for producing a pulse of energy of substantially uniform magnitude and duration in response to each of the electrical discharges, and means responsive to said pulses for controlling the position of the electrode relative to the workpiece.

9. In an electrical arc discharge machining apparatus including an electrode, a workpiece, and means for repetitively establishing an electrical discharge between the electrode and the workpiece, the combination of means for producing a pulse of energy of substantially uniform magnitude and duration in response to each of the electrical discharges, integrating means for producing a direct voltage having a magnitude which varies in accordance with the repetition rate of said pulses, and means responsive to said direct voltage for controlling the position of the electrode relative to the workpiece.

10. In an electrical arc discharge machining apparatus including an electrode, a workpiece, and means for repetitively establishing an electrical discharge between the electrode and the workpiece, the combination of means for producing an output signal in response to each electrical discharge, means including clipping means responsive to said signals for producing an electrical pulse of substantially uniform magnitude and duration, and means responsive to said pulses for controlling the position of the electrode relative to the workpiece.

11. In an electrical arc discharge machining apparatus including an electrode, a workpiece, and means for repetitively establishing an electrical discharge between the electrode and the workpiece, the combination of means for producing an output signal in response to each electrical discharge and having a magnitude and duration which varies in accordance with the magnitude of the electrical discharge, means including clipping means responsive to said signals for producing an electrical pulse of substantially uniform magnitude and duration independently of variations in the magnitude of said signals, and means responsive to said pulses for controlling the position of the electrode relative to the workpiece.

12. In an electrical arc discharge machining apparatus including an electrode, a workpiece, and means for repetitively establishing an electrical discharge between the electrode and the workpiece, the combination of means for producing an output signal in response to each electrical discharge and having a magnitude and duration which varies in accordance with the magnitude and duration of the electrical discharge, means including clipping means responsive to said signals for producing an electrical pulse of substantially uniform magnitude and duration independently of variations in the magnitude and duration of said signals, and means responsive to said pulses for controlling the position of the electrode relative to the workpiece.

13. In an electrical arc discharge machining apparatus including an electrode, a workpiece, and means for repetitively establishing an electrical discharge between the electrode and the workpiece, the combination of means for producing an output signal in response to each electrical discharge, means including clipping means responsive to said signals for producing an electrical pulse of substantially uniform magnitude and duration, and means including means for integrating said pulses responsive to said pulses for controlling the position of the electrode relative to the workpiece.

14. In an electrical arc discharge machinging apparatus including an electrode, a workpiece, and means for repetitively establishing an electrical discharge between the electrode and the workpiece, the combination of means for producing an output signal in response to each electrical discharge and having a magnitude and duration which varies in accordance with the magnitude and duration of the electrical discharge, means including clipping means responsive to said signals for producing an electrical pulse of substantially uniform magnitude and duration independently of variations in the magnitude and duration of said signals, and means including means for integrating said pulses responsive to said pulses for controlling the position of the electrode relative to the workpiece.

15. In an electrical arc discharge machining apparatus including an electrode, a workpiece, and means for repetitively establishing an electrical discharge between the electrode and the workpiece, the combination of means for producing an output signal in response to each electrical discharge and having a magnitude and duration which varies in accordance with the magnitude and duration of the electrical discharge, means including clipping means responsive to said signals for producing an electrical pulse of substantially uniform magnitude and duration independently of variations in the magnitude and duration of said signals, and means including means for integrating said pulses responsive to said pulses for controlling the position of the electrode relative to the workpiece comprising a servo amplifier, and a servo motor electrically connected to said amplifier and mechanically coupled to the electrode.

16. In an electrical arc discharge machining apparatus including an electrode, a workpiece, and means for repetitively establishing an electrical discharge between the electrode and the workpiece, the combination of means comprising a transformer having a primary winding connected in series circuit with the electrode and the workpiece and a secondary winding for producing an energy pulse in response to each of the electrical discharges, means connected to said secondary winding for producing a direct voltage having a magnitude which varies in accordance with the frequency of said pulses, and means responsive to said direct voltage for controlling the position of the electrode relative to the workpiece.

17. In an electrical arc discharge machining apparatus including an electrode, a workpiece, and means for repetitively establishing an electrical discharge between the electrode and the workpiece, the combination of means comprising a transformer having a primary winding connected in series circuit with the electrode and the workpiece and a secondary winding for producing an energy pulse in response to each of the electrical discharges, means including clipping means connected to said secondary winding for producing a direct voltage having a magnitude which varies substantially exclusively in accordance with the frequency of said pulses, and means responsive to said direct voltage for controlling the position of the electrode relative to the workpiece.

18. In an electrical arc discharge machining apparatus including an electrode and a workpiece, the combination of energy supplying means for repetitively applying between the electrode and the workpiece voltage pulses of a preselected frequency for establishing electrical discharges between the electrode and the workpiece of a discharging frequency lower than said preselected frequency, means effective only when a short circuit condition exists between the electrode and the workpiece for producing an output signal having a preselected characteristic, and means responsive to said output signal for moving the electrode away from the work.

19. In an electrical arc discharge machining apparatus including an electrode and a workpiece, the combination of energy supplying means for repetitively applying between the electrode and the workpiece voltage pulses of a preselected frequency for establishing electrical discharges between the electrode and the workpiece of a discharging frequency lower than said preselected frequency, means effective only when a short circuit condition exists between the electrode and the workpiece and responsive to said energy supplying means for producing an output signal having a preselected characteristic, and means responsive to said output signal for moving the electrode away from the work.

20. In an electrical arc discharge machining apparatus including an electrode and a workpiece, the combination of energy supplying means for repetitively applying between the electrode and the workpiece voltage pulses of a preselected frequency for establishing electrical discharges between the electrode and the workpiece of a discharging frequency lower than said preselected frequency, means effective only when a short circuit condition exists between the electrode and the workpiece and responsive to said energy supplying means for producing an output signal of a frequency integrally related to said preselected frequency, and means responsive to said output signal for moving the electrode away from the work.

21. In an electrical arc discharge machining apparatus including an electrode and a workpiece, the combination of energy supplying means for repetitively applying between the electrode and the workpiece voltage pulses of a preselected frequency for establishing electrical discharges between the electrode and the workpiece of a discharging frequency lower than said preselected frequency, means including a transformer having a primary winding connected in series circuit with the electrode and the workpiece and a secondary winding for producing a control signal having a magnitude which varies in accordance with the frequency of the electrical discharges, means responsive to said control signal for controlling the position of the electrode relative to the workpiece, means effective only when a short circuit condition exists between the electrode and the workpiece including said transformer and responsive to said energy supplying means for producing an output signal of a frequency integrally related to said preselected frequency, and means responsive to said output signal for moving the electrode away from the work.

22. In an electrical arc discharge machining apparatus having an electrode and a workpiece, the method of periodically applying a voltage between the electrode and the workpiece for creating electrical discharges between the electrode and the workpiece which comprises the steps of establishing a substantially constant current flow through an inductor, normally directing the current over a path including the electrode and the workpiece, and periodically connecting in shunt of said path a circuit having a low impedance to said current flow relative to the impedance of the gap between the electrode and the workpiece.

23. In an electrical arc discharge machining apparatus having an electrode and a workpiece, the method of periodically applying a voltage between the electrode and the workpiece for creating electrical discharges between the electrode and the workpiece which comprises the steps of establishing a substantially constant current flow through an inductor, normally directing the current over a path including the electrode and the workpiece, and periodically shunting said current in bypass of the electrode and the workpiece.

24. In an electrical arc discharge machining apparatus including an electrode and a workpiece, a source of electrical energy, an inductor, means connecting said inductor across the gap between the electrode and the workpiece and in series circuit therewith, switching means for connecting said source in series with said inductor, and means independent of said inductor for periodically actuating said switching means at a frequency sufficiently high to maintain substantially constant current through said inductor.

25. In an electrical arc discharge machining apparatus including an electrode and a workpiece, a primary energy storage device comprising an inductor, a series arc discharge circuit including said inductor, the electrode and the workpiece, a control circuit including a source of energy, a two-state switching device and the inductor, and means independent of said inductor for periodically changing the state of said switching device at a frequency sufficiently high to maintain substantially constant current through said inductor, said inductor creating a discharge between said electrode and said workpiece in response to one change of state of said switching device, said discharge being terminated directly in response to the next change of said state of said switching device.

26. In an electrical arc discharge machining apparatus including an electrode and a workpiece, a primary energy storage device comprising an inductor, a series discharge circuit including said inductor, the electrode and the workpiece, and a control circuit including a source of energy, a periodically actuated switching device and the inductor, means including said control circuit and said discharge circuit for establishing a continuous and substantially constant unidirectional current flow through said inductor, and means including said periodically actuated switching means for periodically diverting said current from said discharge circuit to said control circuit.

27. In an electrical arc discharge machining apparatus including an electrode and a workpiece, a primary energy storage device comprising an inductor, a series arc discharge circuit including said inductor, the electrode and the workpiece, and a control circuit including a source of energy, a periodically actuated switching device and the inductor, means including said control circuit and said discharge circuit for establishing a substantially constant current flow through said inductor, and means including said periodically actuated switching means for causing said current alternately to flow in said discharge circuit and said control circuit.

28. In an electrical arc discharge machining apparatus including an electrode and a workpiece, a first series circuit including an inductor, the electrode, and the workpiece, and a second series circuit including a source of energy, switch means and the inductor, and means independent of said inductor for periodically actuating said switching means at a frequency sufficiently high to maintain substantially constant current through said inductor.

29. In an electrical arc discharge machining apparatus including an electrode and a workpiece, a first series circuit including an inductor, a unidirectional current conducting device, the electrode, and the workpiece, and a second series circuit including a source of energy, periodically actuated switch means and the inductor.

30. In an electrical arc discharge machining apparatus including an electrode and a workpiece, a first series circuit including an inductor, a resistor, the electrode, and the workpiece, and a second series circuit including a source of energy, periodically actuated switch means, said resistor, and the inductor.

31. In an electrical arc discharge machining apparatus including an electrode and a workpiece, a first series circuit including an inductor, the electrode, and the workpiece, and a second series circuit including a source of energy, switch means and the inductor, means independent of said inductor for periodically actuating said switching means at a frequency sufficiently high to maintain substantially constant current through said inductor, and a capacitor connected in shunt of the electrode and the workpiece.

32. In an electrical arc discharge machining apparatus including an electrode and a workpiece, a first series circuit including an inductor, a source of energy, the electrode, and the workpiece, and a second series circuit including a second source of energy, periodically actuated switch means, and the inductor.

33. In an electrical arc discharge machining apparatus including an electrode and a workpiece, a first series circuit including an inductor, a source of energy, a rectifier poled to pass electrical current in the direction of the polarity of said source of electrical energy, the electrode, and the workpiece, and a second series circuit including another source of energy, periodically actuated switch means, and the inductor.

34. In an electrical arc discharge machining apparatus including an electrode and a workpiece, a first series circuit including an inductor, the electrode, and the workpiece, a second series circuit including a source of energy, periodically actuated switch means, and the inductor, and degenerative feedback means for facilitating extinction on a discharge between the electrode and the workpiece comprising a resistor connected in series with the inductor.

35. In an electrical arc discharge machining apparatus including an electrode and a workpiece, a first series circuit including an inductor, the electrode, and the workpiece, a second series circuit including a source of energy, periodically actuated switch means, and the inductor, and unidirectional current conducting means connected in series with said inductor and the electrode and workpiece poled to pass current in said first series circuit through said inductor in the same direction as the current through said inductor in said second series circuit.

36. In an electrical arc discharge machining apparatus including an electrode and a workpiece, a first series circuit including an inductor, the electrode, and the workpiece, a second series circuit including a source of energy, periodically actuated switch means, and the inductor, and unidirectional current conducting means connected in series with said inductor and the electrode and workpiece poled to pass current in said first series circuit through said inductor in the same direction as the current through said inductor in said second series circuit and to transiently pass reverse current.

37. In an electrical discharge machining apparatus including an electrode and a workpiece, the combination of means for repetitively establishing an electrical discharge between the electrode and the workpiece for establishing an abrupt wave form current in a circuit including the electrode and the workpiece, means including resonant means effective when the electrode is shorted to the workpiece for producing a different wave form current in the circuit including the electrode and the workpiece, circuit means responsive to said abrupt wave form current for producing an output signal having an amplitude which varies with the frequency of said abrupt wave form current and responsive to said different wave form current for producing an output signal having a substantially different amplitude than the amplitude of the output signal produced in response to the abrupt wave form current, and means controlled by said circuit means for controlling the position of the electrode relative to the workpiece.

38. In an electrical discharge machining apparatus including an electrode and a workpiece, the combination of means for repetitively establishing an electrical discharge between the electrode and the workpiece for establishing an abrupt wave form current in a circuit including the electrode and the workpiece, means including resonant means effective when the electrode is shorted to the workpiece for producing a different wave form current in the circuit including the electrode and the workpiece, circuit means responsive to said abrupt wave form current for producing an output signal having an amplitude which varies with the frequency of said abrupt wave form current and responsive to said different wave form current for producing an output signal having a substantially different amplitude than the amplitude of the output signal produced in response to the abrupt wave form current of the same frequency, and means controlled by said circuit means for controlling the position of the electrode relative to the workpiece.

39. In an electrical discharge machining apparatus including an electrode and a workpiece, the combination of means for repetitively establishing an electrical discharge between the electrode and the workpiece for establishing an abrupt wave form current in a circuit including the electrode and the workpiece, means including resonant means effective when the electrode is shorted to the workpiece for producing a sinusoidal wave form current in the circuit including the electrode and the workpiece, circuit means responsive to said abrupt wave form current for producing an output signal having an amplitude which varies with the frequency of said abrupt wave form current and responsive to said sinusoidal wave form current for producing an output signal having a substantially different amplitude than the amplitude of the output signal produced in response to the abrupt wave form current, and means controlled by said circuit means for controlling the position of the electrode relative to the workpiece.

40. In an electrical discharge machining apparatus including an electrode and a workpiece, the combination of means for repetitively establishing an electrical discharge between the electrode and the workpiece for establishing an abrupt wave form current in a circuit including the electrode and the workpiece, means including resonant means effective when the electrode is shorted to the workpiece for producing a sinusoidal wave form current in the circuit including the electrode and the workpiece, circuit means responsive to said abrupt wave form current for producing an output signal having an amplitude which varies substantially exclusively with the frequency of said abrupt wave form current and responsive to said sinusoidal wave form current for producing an output signal having a substantially different amplitude than the amplitude of the output signal produced in response to the abrupt wave form current of the same frequency, and means controlled by said circuit means for controlling the position of the electrode relative to the workpiece.

41. In an electrical arc discharge machining apparatus including an electrode, a workpiece, and means for repetitively establishing an electrical discharge between the electrode and the workpiece, the combination of means for deriving a repetitive signal the rate of repetition of which varies in accordance with the rate of repetition of said electrical discharges, means responsive to said signal for deriving a control voltage having a characteristic which varies in accordance with the rate of repetition of said signal, and means responsive to said control voltage for controlling the position of the electrode relative to the workpiece.

42. The method of electrical arc discharge machining and of extinguishing any substantially direct-current arc which occurs between the electrode and the workpiece in an electrical arc discharge machining apparatus which comprises the steps of repetitively establishing short duration discrete arc discharges between the electrode and the workpiece while the electrode and the workpiece are spaced apart, and moving the electrode toward the workpiece, whenever the arc fails to extinguish between the discharges while the electrode and workpiece are spaced apart and continues as a substantially direct-current arc, until the substantially direct-current arc is extinguished.

43. The method of electrical arc discharge machining and of extinguishing any substantially direct-current arc which occurs between the electrode and the workpiece in an electrical arc discharge machining apparatus which comprises the steps of repetitively establishing short duration discrete arc discharges between the electrode and the workpiece while the electrode and the workpiece are spaced apart, and moving the electrode toward and into engagement with the workpiece, whenever the arc fails to extinguish between the discharges while the electrode and workpiece are spaced apart and continues as a substantially direct-current arc, to extinguish the substantially direct-current arc.

44. The method of electrical arc discharge machining and of correcting a substantially direct-current arcing condition between an electrode and a workpiece in an electrical arc discharge machining apparatus which comprises the steps of repetitively establishing short duration discrete arc discharges between the electrode and the workpiece while the electrode and the workpiece are spaced apart, moving the electrode toward the workpiece, whenever the arc fails to extinguish between the discharges while the electrode and workpiece are spaced apart and continues as a substantially direct-current arc, until the substantially direct-current arc is extinguished, and thereafter moving the electrode away from the workpiece and again repetitively establishing short duration discrete arc discharges between the electrode and the workpiece while the electrode and the workpiece are spaced apart.

References Cited in the file of this patent
UNITED STATES PATENTS

| | | |
|---|---|---|
| 1,061,377 | Heany | May 13, 1913 |
| 2,026,943 | Kennedy | Jan. 7, 1936 |
| 2,079,310 | Bennett | May 4, 1937 |
| 2,356,621 | Sciaky | Aug. 22, 1944 |
| 2,785,283 | Sumner | Mar. 12, 1957 |
| 2,798,934 | Bruma | July 9, 1957 |
| 2,900,575 | Ramsay | Aug. 18, 1959 |
| 2,903,556 | McKechnie | Sept. 8, 1959 |
| 2,927,191 | Matulaitis | Mar. 1, 1960 |